United States Patent
Cao et al.

(10) Patent No.: US 8,156,097 B2
(45) Date of Patent: Apr. 10, 2012

(54) TWO STAGE SEARCH

(75) Inventors: Yunbo Cao, Haidian District (CN); Hang Li, Chaoyang District (CN)

(73) Assignee: Microsoft Corporation, Redmond, WA (US)

( * ) Notice: Subject to any disclaimer, the term of this patent is extended or adjusted under 35 U.S.C. 154(b) by 529 days.

(21) Appl. No.: 11/273,314

(22) Filed: Nov. 14, 2005

(65) Prior Publication Data
US 2007/0112720 A1    May 17, 2007

(51) Int. Cl.
*G06F 7/00*     (2006.01)
*G06F 17/30*    (2006.01)

(52) U.S. Cl. ........................................... 707/706

(58) Field of Classification Search ............... 707/1, 3, 707/4, 5, 6, 7, 100, 102, 200, 706, 999.003
See application file for complete search history.

(56) References Cited

U.S. PATENT DOCUMENTS

| | | | |
|---|---|---|---|
| 6,223,165 B1* | 4/2001 | Lauffer ........................... | 705/8 |
| 7,031,961 B2* | 4/2006 | Pitkow et al. ................... | 707/4 |
| 7,181,438 B1* | 2/2007 | Szabo ............................. | 707/2 |
| 2003/0115187 A1* | 6/2003 | Bode et al. ..................... | 707/3 |
| 2003/0158855 A1* | 8/2003 | Farnham et al. .............. | 707/102 |
| 2004/0133557 A1* | 7/2004 | Wen et al. ..................... | 707/3 |
| 2005/0234904 A1* | 10/2005 | Brill et al. ..................... | 707/5 |
| 2006/0059147 A1* | 3/2006 | Weiss et al. .................... | 707/6 |
| 2006/0074883 A1* | 4/2006 | Teevan et al. .................. | 707/3 |
| 2007/0038601 A1* | 2/2007 | Guha .............................. | 707/3 |
| 2007/0219976 A1* | 9/2007 | Muralidhar et al. ............ | 707/4 |
| 2007/0255702 A1* | 11/2007 | Orme ............................. | 707/5 |
| 2008/0104032 A1* | 5/2008 | Sarkar ............................ | 707/3 |

* cited by examiner

*Primary Examiner* — Aleksandr Kerzhner
(74) *Attorney, Agent, or Firm* — Westman, Champlin & Kelly, P.A.

(57) ABSTRACT

A two stage model identifies individuals having knowledge in a subject matter area relevant to a query. A relevance model receives a query and identifies documents, or other information, relevant to the query. A co-occurrence model identifies individuals, in the retrieved documents, related to the subject matter of the query. Individuals identified can be scored by combining scores from the relevance model and the co-occurrence model and output in a rank ordered list.

20 Claims, 7 Drawing Sheets

TWO STAGE SEARCH

BACKGROUND

Currently, people are using computer systems in an attempt to locate people that are experts, or highly knowledgeable, in a specific subject matter area. This type of expert searching is of growing importance, particularly in relatively large companies. For instance, in companies that have several hundreds, to many thousands, of employees, it can be very important to find knowledgeable people, within the company, about certain subject matter areas. This greatly assists in leveraging the knowledge of individuals in the company, in order to obtain efficacies.

Some current searching systems attempt to accomplish this task by generating a model indicative of how often a person authored a type of document. While this type of system does identify authors, it is not highly effective in identifying experts in subject matter areas that are relevant to a given query.

Of course, current information retrieval systems receive a query and attempt to retrieve documents relevant to that query. These types of information retrieval systems are, as with the ones mentioned previously, not highly helpful in identifying persons having a great deal of knowledge in a subject matter area relevant to a query.

The discussion above is merely provided for general background information and is not intended to be used as an aid in determining the scope of the claimed subject matter.

SUMMARY

A two stage model identifies individuals having knowledge in a subject matter area relevant to a query. A relevance model receives a query and identifies documents, or other information, relevant to the query. A co-occurrence model identifies individuals, in the retrieved documents, related to the subject matter of the query. Individuals identified can be scored by combining scores from the relevance model and the co-occurrence model and output in a rank ordered list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present subject matter deals with identifying individuals having knowledge in certain subject matter areas. However, before describing the system in more detail, one illustrative environment in which it can be practiced will be described.

Figure 1:
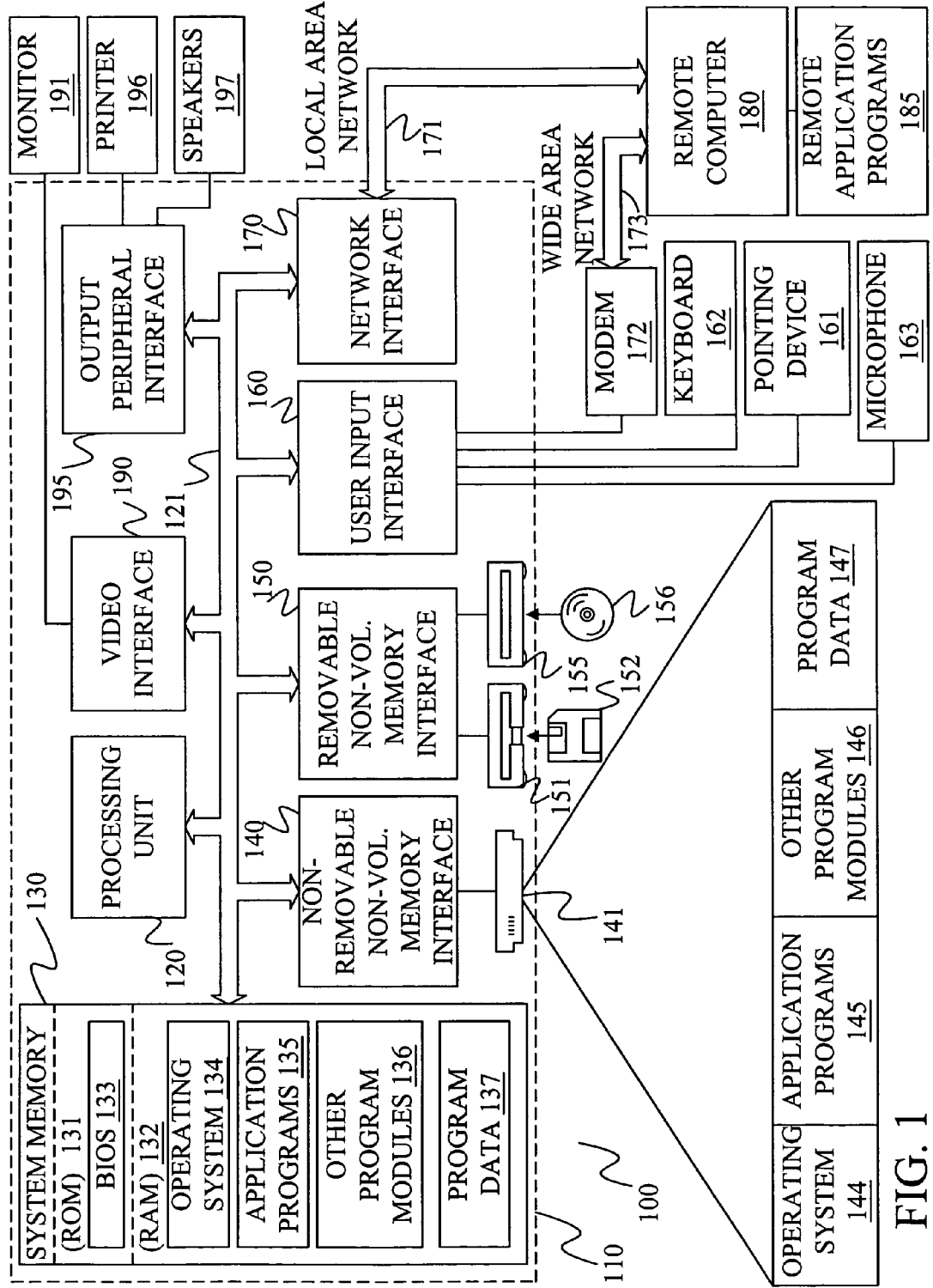
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2A:
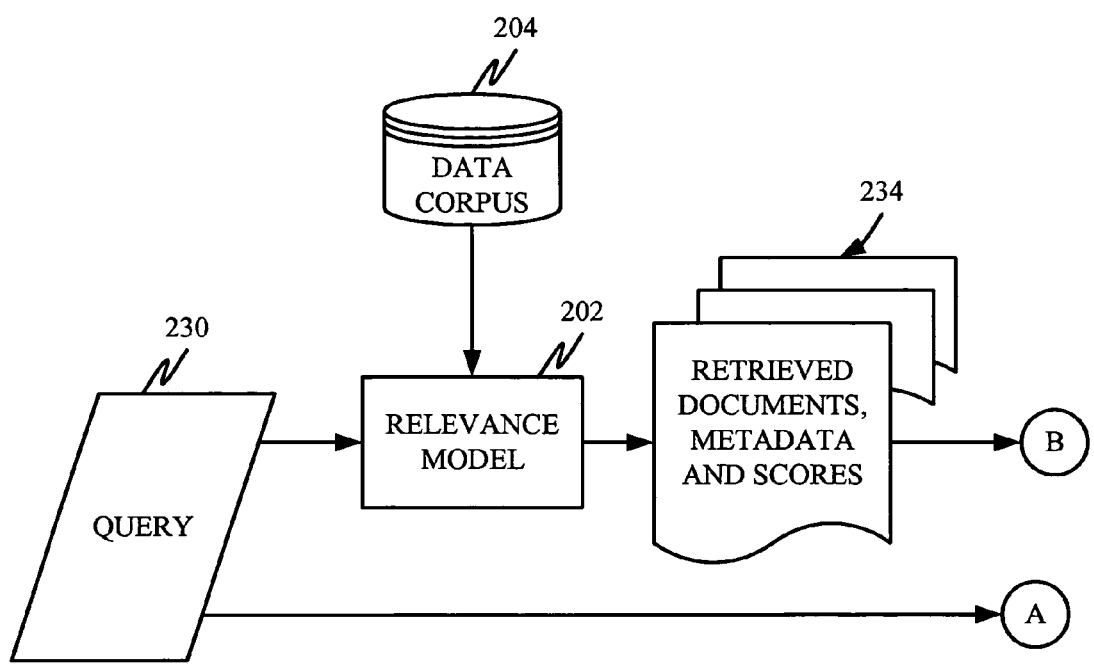
FIGS. 2A and 2B (collectively FIG. 2) are a more detailed block diagram of one embodiment of an expert search system.
Figure 2B:
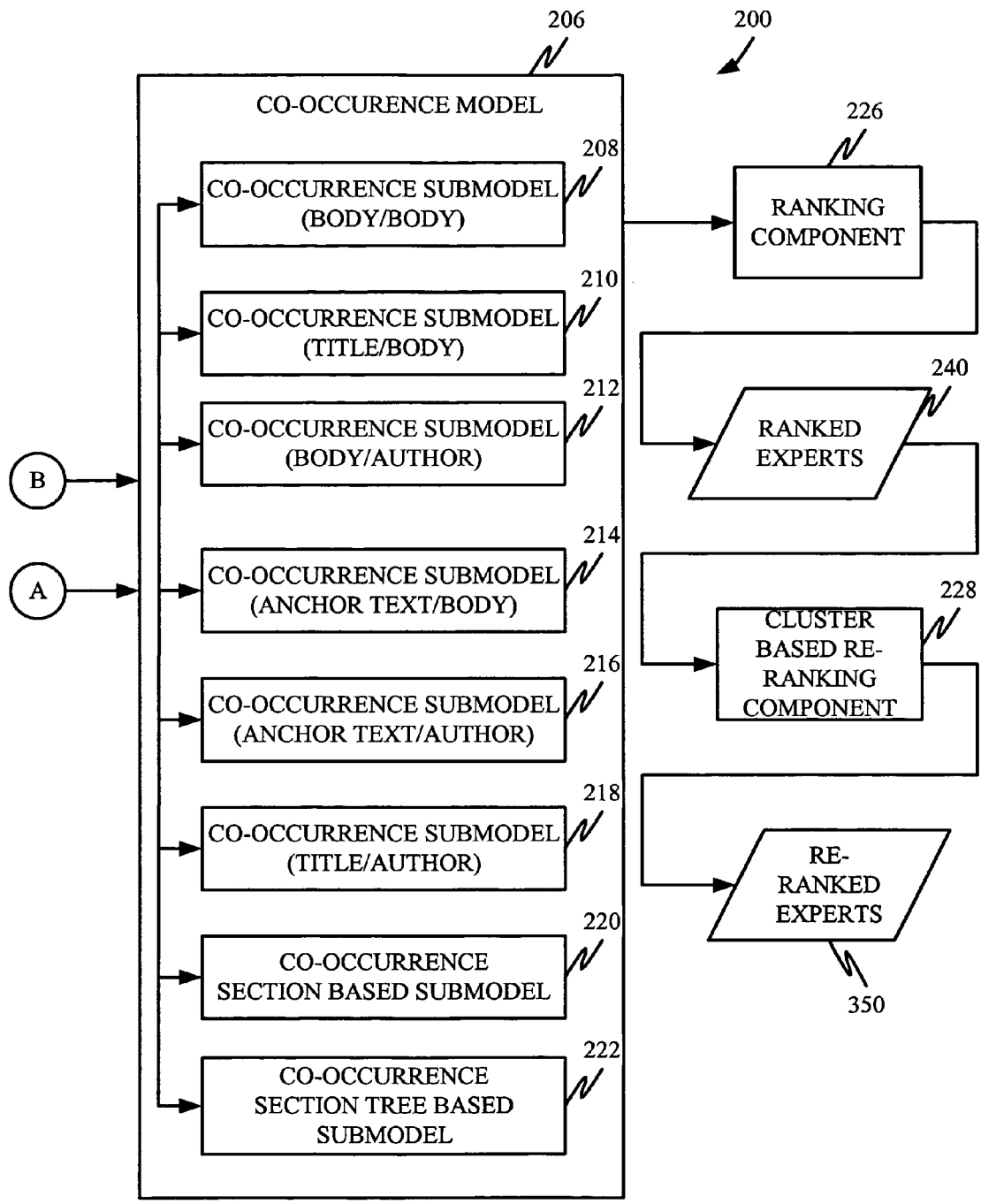

FIGS. 2A and 2B (collectively FIG. 2) show a more detailed block diagram of an expert search system 200 in accordance with one embodiment. System 200 includes a relevance model 202 that accesses a data corpus 204. System 200 also includes a co-occurrence model 206 that includes a plurality of co-occurrence submodels which are described in detail below. The illustrative embodiment shown in FIG. 2 illustrates exemplary co-occurrence submodels 208, 210, 212, 214, 216, 218, 220, and 222. The submodels shown by way of example in FIG. 2 are described in greater detail below. FIG. 2 also shows that system 200 includes ranking component 226 and cluster based re-ranking component 228.

Figure 3:
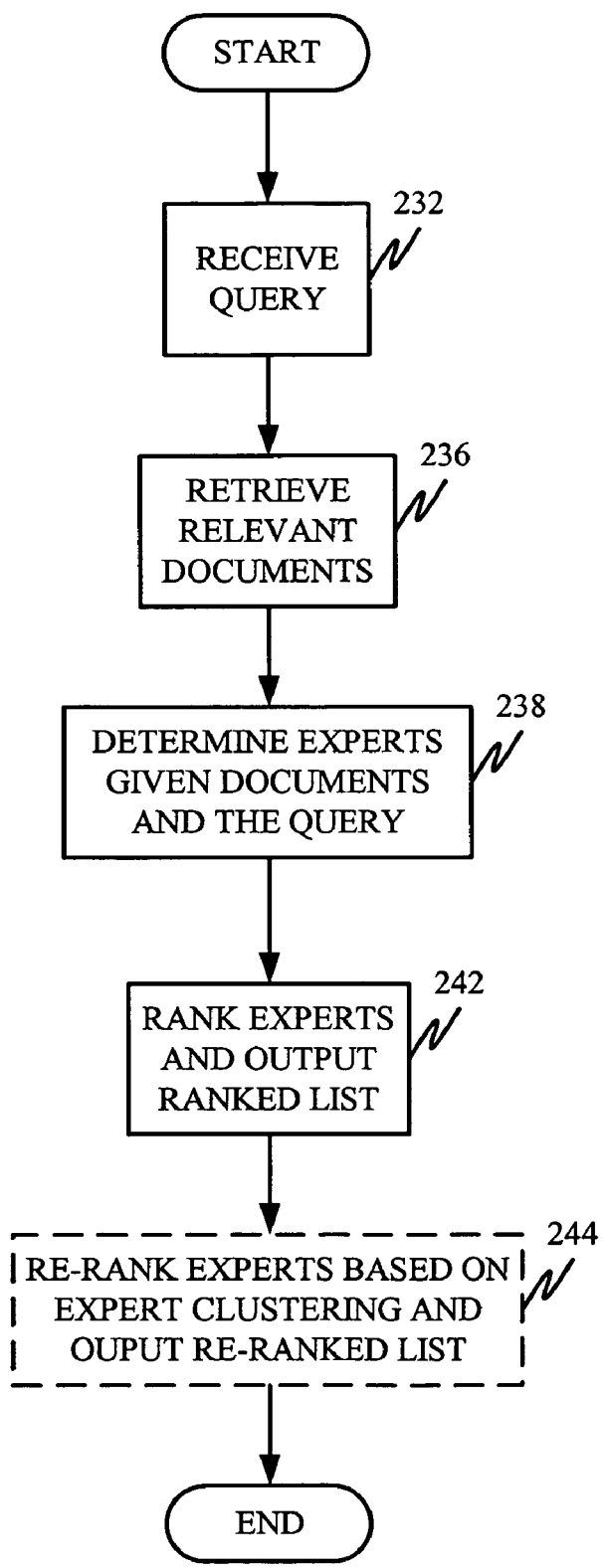
FIG. 3 is a flow diagram illustrating one embodiment of the overall operation of the system shown in FIG. 2

FIG. 3 is a flow diagram better illustrating the operation of system 200 shown in FIG. 2. Relevance model 202 first receives a query 230 from a user. The query is illustratively a textual input indicative of a subject matter area for which the user desires to find an expert, or an individual having significant knowledge of that subject matter area. Receiving the query is indicated by block 232 in FIG. 3.

Relevance model 202 retrieves from data corpus 204 a plurality of relevant documents 234, that are relevant to query 230. Retrieving the documents is indicated by block 236 in FIG. 3. Relevance model 202 can illustratively be comprised of any known information retrieval system. One example is a language model, that receives the input query 230 and performs information retrieval on data corpus 204 to identify relevant documents 234. In one illustrative embodiment, as described in more detail below, documents 234 also include related metadata that describes such things as the author, anchor text, title, body, and sections, of each of the retrieved, relevant documents 234.

The relevance model 202 also illustratively generates a score or confidence measure, or other metric, corresponding to each of the documents 234 that indicates how relevant those documents are to the received query 230. The score or metric is illustratively provided, along with documents 234, to co-occurrence model 206. Therefore, it can be seen that relevance model 202 identifies documents from corpus 204 that are relevant to the query 230.

Co-occurrence model 206 receives query 230 (or a parsed representation, or other representation, of query 230 generated by relevance model 202) along with documents 234. Model 206 also receives, in one embodiment, the metadata and scores corresponding to documents 234. Co-occurrence model 206 determines whether the subject matter of query 230 is associated with any individual persons, and identifies those persons. Co-occurrence model 206 does this by utilizing the submodels in considering both the query 230 and the documents 234 provided by relevance model 202. Determining the experts, given the documents 234 in query 230, is indicated by block 238 in FIG. 3.

Based on the results of applying the submodels in co-occurrence model 206, and based on the scores from relevance model 202, ranking component 226 ranks a list of individuals as experts in the subject matter of the query 230. The identified experts are ranked according to a combined score provided by relevance model 202 and co-occurrence model 206. Ranking the experts and outputting the ranked list 240 is indicated by block 242 in FIG. 3.

In one specific example, relevance model 202 and co-occurrence model 206 are combined together and used by ranking component 226 in ranking the experts. This two stage model is illustratively defined as follows:

$$P(e|q) = \sum_d P(e, d|q) \quad \text{Eq. 1}$$
$$= \sum_d P(d|q)P(e|d, q)$$

While any models can be used, in the embodiment illustrated, both models 202 and 206 are statistical models, and in one illustrative embodiment, they are both statistical language models. Therefore, P(d|q) denotes the probability of a document, given the query 230, and is indicative of the score provided by relevance model 202. P(e|d,q) denotes the probability of an expert (or person, e) given the document d and the query q.

The co-occurrence model score is estimated as follows:

$$p(e|d, q) = \mu \frac{pf(e, d)}{|d|} + (1-\mu) \sum_{d': e \in d'} \frac{pf(e, d')}{|d'|} \Big/ df_e \quad \text{Eq. 2}$$

where pf(e,d) represents the count of the occurrences of the person e in the document d; |d| represents the length of the document d in terms of the count of the occurrences of the person in that document d; and $df_e$ represents the count of the documents in which the person e occurs. Also, in one embodiment, the known technique of Dirichlet prior smoothing is used in determining the linear parameter µ as follows:

$$\mu = \frac{|d|}{|d| + \kappa} \quad \text{Eq. 3}$$

where κ is a parameter setting that is illustratively set to the average length of the documents in the collection of relevant documents 234. This length is illustratively in terms of the number of occurrences of the persons in those documents.

Ranking component 226 uses these scores to generate the list of ranked experts 240. In one illustrative embodiment, however, the list of ranked experts 240 can be provided to a cluster based re-ranking component 228 which re-ranks the ranked experts 240 (or at least some of them) based on their relation to one another. This is indicated by block 244 in FIG. 3 and is described in greater detail below with respect to FIG. 6.

Figure 4:
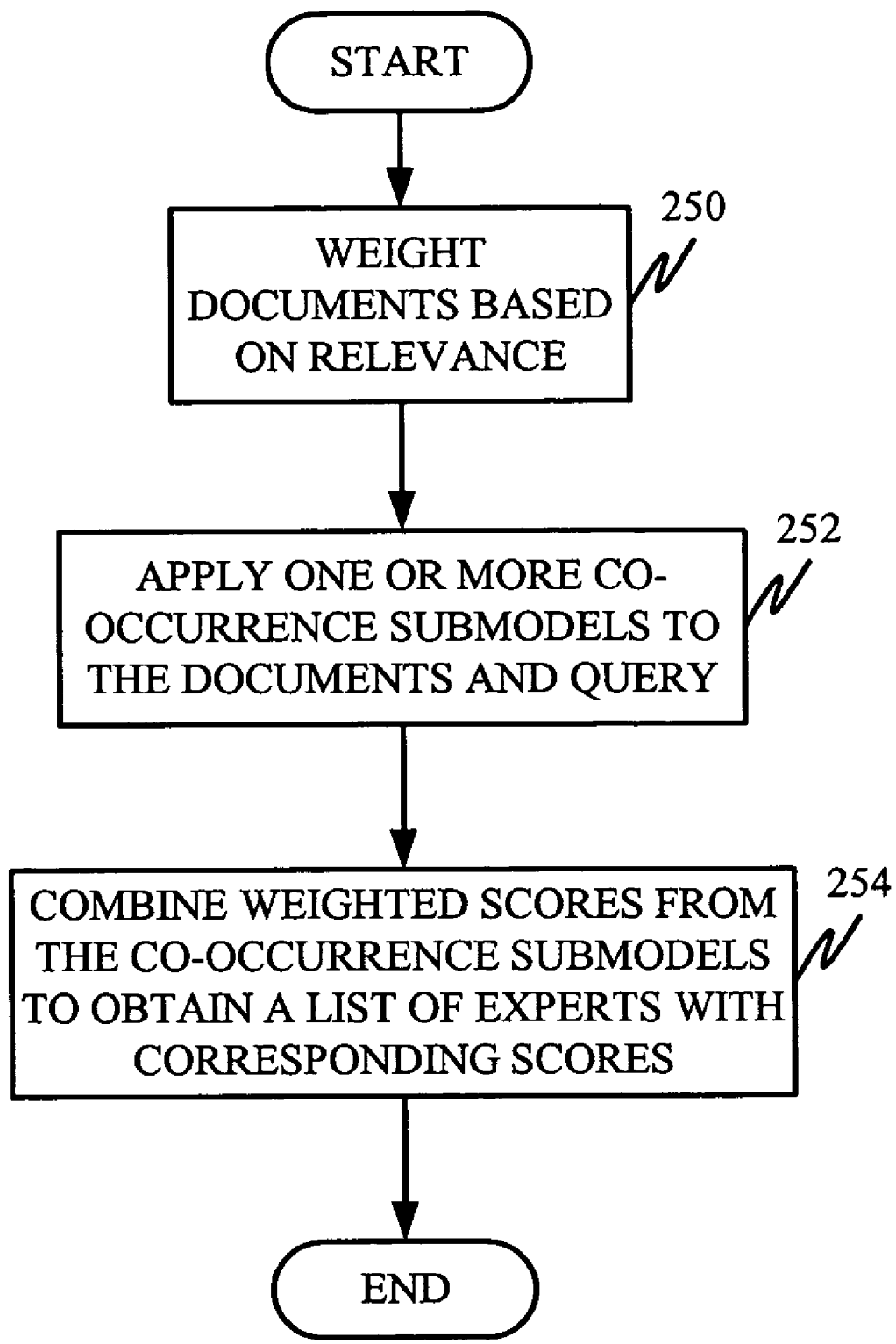
FIG. 4 is a flow diagram illustrating one embodiment of the operation of the co-occurrence model shown in FIG. 2.

FIG. 4 is a flow diagram better illustrating the step of determining the experts given the documents and the query indicated by numeral 238 in FIG. 3. First, as discussed above, relevance model 202 retrieves documents 234 and assigns a weight or score to each of those documents. This is indicated by block 250 in FIG. 4.

Co-occurrence model 206 applies one or more of the co-occurrence submodels to the documents 234 and the query 230. This is indicated by block 252 in FIG. 4. Where a plurality of submodels are used in co-occurrence model 206, the contribution of each of those models can be weighted such that more important models are weighted more heavily. The weights can be determined empirically, or otherwise. Combining the weighted scores from the co-occurrence submodels to obtain the list of ranked experts 240, along with the scores associated with those ranked experts 240 is indicated by block 254 in FIG. 4.

A number of the co-occurrence submodels for co-occurrence model 206 will now be described in greater detail. In a relatively simple form, co-occurrence model 206 does not use any metadata information corresponding to documents 234. In that case, co-occurrence submodel 208 is used. Submodel 208 simply identifies whether the subject matter of the query and a candidate person (who is a possible expert for the subject matter of the query) co-occur in the body of the text of the retrieved documents 234. Co-occurrence submodel 208 can thus simply be referred to as a document-based co-occurrence submodel, or a body/body co-occurrence submodel. The body/body notation simply indicates that the submodel looks to determine whether both the subject matter of the query and the candidate person both occur in the body of the text of the relevant documents 234. The subject matter of the query can be represented in any desirable way, such as a logical form, another dependency structure, a parse tree or simply content words in the query. It has been found that even this relatively simple two stage model provides significant advantages in average precision and recall over a co-occurrence model by itself.

In another embodiment, body/body submodel 208 can be revised such that it takes into account proximity as a metric in identifying an expert. In the revised body/body submodel 208, a portion of text is defined according to a certain size in words. The submodel then considers the subject matter of the query and the candidate person to co-occur in the body of the document only if they co-occur within the same defined portion of the document.

For instance, assume that a relevant document 234 is divided up into multiple portions of 200 words each. The body/body submodel 208 will only determine that the candidate person and the subject matter of the query co-occur in the body of the document if they co-occur within one of the predefined 200-word portions. Of course, in another embodiment, the 200-word portion is a sliding window such that the divisions of the window are not predefined. Instead, the candidate person and subject matter of the query will be found to co-occur in the body of the document if they co-occur within 200 words of each other. Of course, any given size portion can be used, and the particular size can be determined empirically. In one illustrative embodiment, however, it was found that a size of 200 words works well.

In accordance with another embodiment, the metadata corresponding to the retrieved relevant documents 234 is used by various co-occurrence submodels 208-222. In the illustrative embodiment, the metadata that is used by the co-occurrence submodels 208-222 is metadata that identifies the body, title, author, anchor text, and sections of the retrieved documents 234. The body metadata identifies the body of the document, as opposed to the title, author, abstract, and bibliography, for instance. The title metadata identifies the title of the document. The author metadata identifies the author of the document, the section metadata can be used to identify a plurality of different text blocks as separate and unique sections of the document. These can be based on HTML tags, for example, and are described in greater detail below. The anchor text metadata is information used in labeling text of links in a document.

Based on this metadata, the submodels 208-222 can be generated. As briefly described above, the body/body submodel 208 is a model which identifies the co-occurrence of the topic or subject matter of query 230 and the author in the body of the text.

The title/body co-occurrence submodel 210 identifies a co-occurrence if the topic or subject matter of the query 230 is found in the title and the candidate person is found in the body of the document 234. The body/author co-occurrence submodel 212 identifies a co-occurrence if the topic or subject matter of the query 230 is found in the body of the document 234 and the candidate person is found in the author section of the document 234. The anchor text/body submodel 214 identifies a co-occurrence if the subject matter of query 230 appears in the anchor text and the candidate person appears in the body of document 234. The anchor text/author co-occurrence submodel 216 identifies a co-occurrence if the topic or subject matter of the query 230 is found in anchor text and the candidate person is found in the author section of the document 234. The title/author co-occurrence submodel 218 identifies a co-occurrence if the topic or subject matter of the query 230 is found in the title and the candidate person is found in the author section of the document 234. Section based submodel 220 and section-tree based submodel 222 are described in greater detail below.

In one illustrative embodiment, each of the submodels in co-occurrence model 206 can be represented as shown in Eq. 2 above. The different co-occurrence submodels can be linearly combined together to form a single co-occurrence submodel score for each person, as follows:

$$p(e|d,q) = \sum_m \lambda_m p_m(e|d,q) \qquad \text{Eq. 4}$$

where $p_m(e|d,q)$ denotes the score for the $m^{th}$ co-occurrence submodel. For instance, with the title/body co-occurrence submodel 210, if the subject matter of the query 230 occurs in the title of the document 234, the submodel 210 estimates Eq. 2 by counting persons in the body of the corresponding document.

It might be found that different ones of the co-occurrence submodels 208-222 are more or less important than others in providing an accurate expert list. In that case, different ones of the individual co-occurrence submodels, or groups of them, can be weighted differently. Therefore the weights $\lambda_m$ can be set empirically. In one illustrative embodiment the title/author co-occurrence submodel 218 can be weighted most heavily.

In another illustrative embodiment, different combinations of the co-occurrence submodels can be used with varying weights, as desired. In one illustrative embodiment, the body/body submodel 208 can be used with the title/author submodel 218, and they can be weighted as desired. In one illustrative embodiment, they are weighted 1 and 45, respectively, although a wide variety of other submodel combinations and weights can be used, and those combinations and weights can be determined empirically or otherwise.

The two co-occurrence submodels 220 and 222 which are based on section metadata will now be described in more detail. In one illustrative embodiment, section metadata divides the relevant documents 234 into relatively fine-grained sections, and the co-occurrence submodels can be configured to define a co-occurrence based on whether the subject matter of the query 230 and the candidate person co-occur within those fine-grained sections. For instance, a section might be defined as the text block enclosed by a set of any of the HTML tags listed in Table 1 below.

TABLE 1

HTML tags for identifying <section>

<table>, <ol>, <p>, <ul>, <pre>, <li>, <dl>, <dt>, <tr>, <hr>

Of course, sections can be defined using any other tags, or other markers, not necessarily tags, as desired. In any case, given the example in which Table 1 defines the HTML tags that identify sections, then given a query in a document, section-based submodels search for co-occurrences of subject matter and persons within the span of a section, not to exceed a given larger portion. For instance, if the document 234 is also divided into portions (as described above with respect to a 200 word portion) then the narrower (more granular) section defined by the HTML tag will be subordinate to the larger portion. In that case, if either the left or the right boundary of the narrower section defined by the HTML tag exceeds a boundary of the given larger portion, then the boundary of the larger portion can be used by default. Thus, the section-based submodel 220 is configured to identify co-occurrences of the subject matter of the query 230 and the candidate person within these more narrowly defined, fine-grained sections within a relevant document 234.

Figure 5:
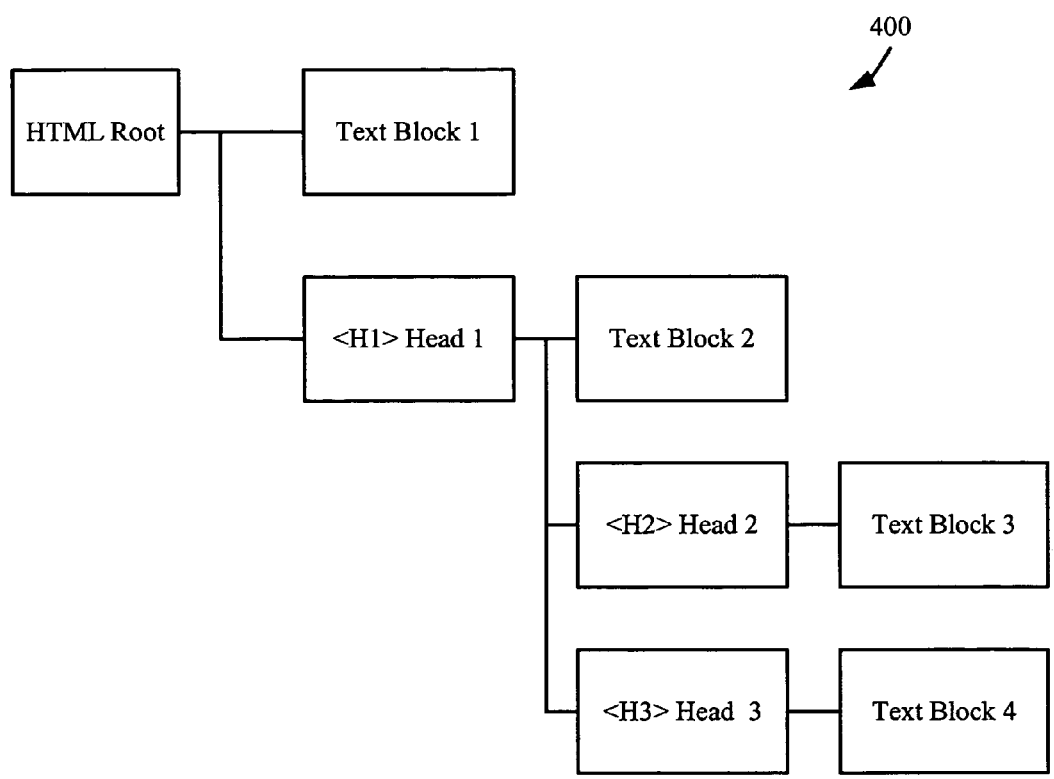
FIG. 5 is a block diagram illustrating a hierarchical tree section.

Section-tree based co-occurrence submodel 222 can use section information in a different way. Model 222 accommodates the realization that some sections are subordinate to other sections. For example, in technical literature, it is very common to have parent sections identified by numerals (such as section 1, section 2, section 3, etc.). However, it is also very common to have each of those numbered sections include descendent subsections (such as section 1.1, 1.2, 1.2.1, etc.). In that case, it may be desirable to have a co-occurrence recognized if the co-occurrence occurs anywhere within the overall section, as opposed to only the subsections. Therefore, section-tree based co-occurrence submodel 222 determines co-occurrences on the base of a section-tree structure such as that shown in FIG. 5. Of course, FIG. 5 is only an exemplary tree structure, and any other structure could be used as well. However, in FIG. 5, the HTML tags, <H1>, <H2>, <H3>, <H4>, <H5>, and <H6>, are used in defining the <section>s for section-tree 400. In addition, a priority is defined for the tags as follows:

$$<H1> \succ <H2> \succ <H3> \succ <H4> \succ <H5> \succ <H6>.$$

Then a tree-structure, such as structure 400 shown in FIG. 5, can be constructed and sub-model 222 can be generated based on that tree structure 400. Table 2 illustrates one exemplary embodiment for the operation of submodel 222.

TABLE 2

```
1) For a given query q
2)     Foreach Text Block Ti{
3)         Get the ancestor path AncestorPath (Ti)
4)         if (match (AncestorPath (Ti), q)){
5          Foreach candidate experts e appears in the
Text Block Ti{
6              count the co-occurrence of e and the
topic q;}
8          }
9 }
```

It can be seen that, in the embodiment shown in Table 2, submodel 222 exploits the association of the subject matter of queries and experts within the HEAD fields of HTML and the associated text blocks. In Table 2, the function AncestorPath (Ti) is used to concatenate all the texts in the path from the HTML root to the text block Ti. For instance, in FIG. 5, the AncestorPath for Text Block 3 is "HTML Root><H1>Head1-><H2>Head2". In line 4 of Table 2, the function match (AncestorPath (Ti), q) embodies the rules that match the query q to the AncestorPath(Ti). These rules return "true" when all the content words in the query q appear in the ancestor path, and otherwise return false.

Regardless of which co-occurrence submodels are used, the scores for those submodels are combined by ranking component 226 and a list of ranked experts 240 is output. Rank experts 240 will be ranked in order of their relationship to the subject matter of query 230.

In one illustrative embodiment, the list of ranked experts 240 can be re-ranked based on a relationship of the experts with one another. In an exemplary embodiment, the relationship between the experts lies in two categories:

1. Candidates appear in similar contexts; and
 2. Candidates co-occur in some local contexts.

Figure 6:
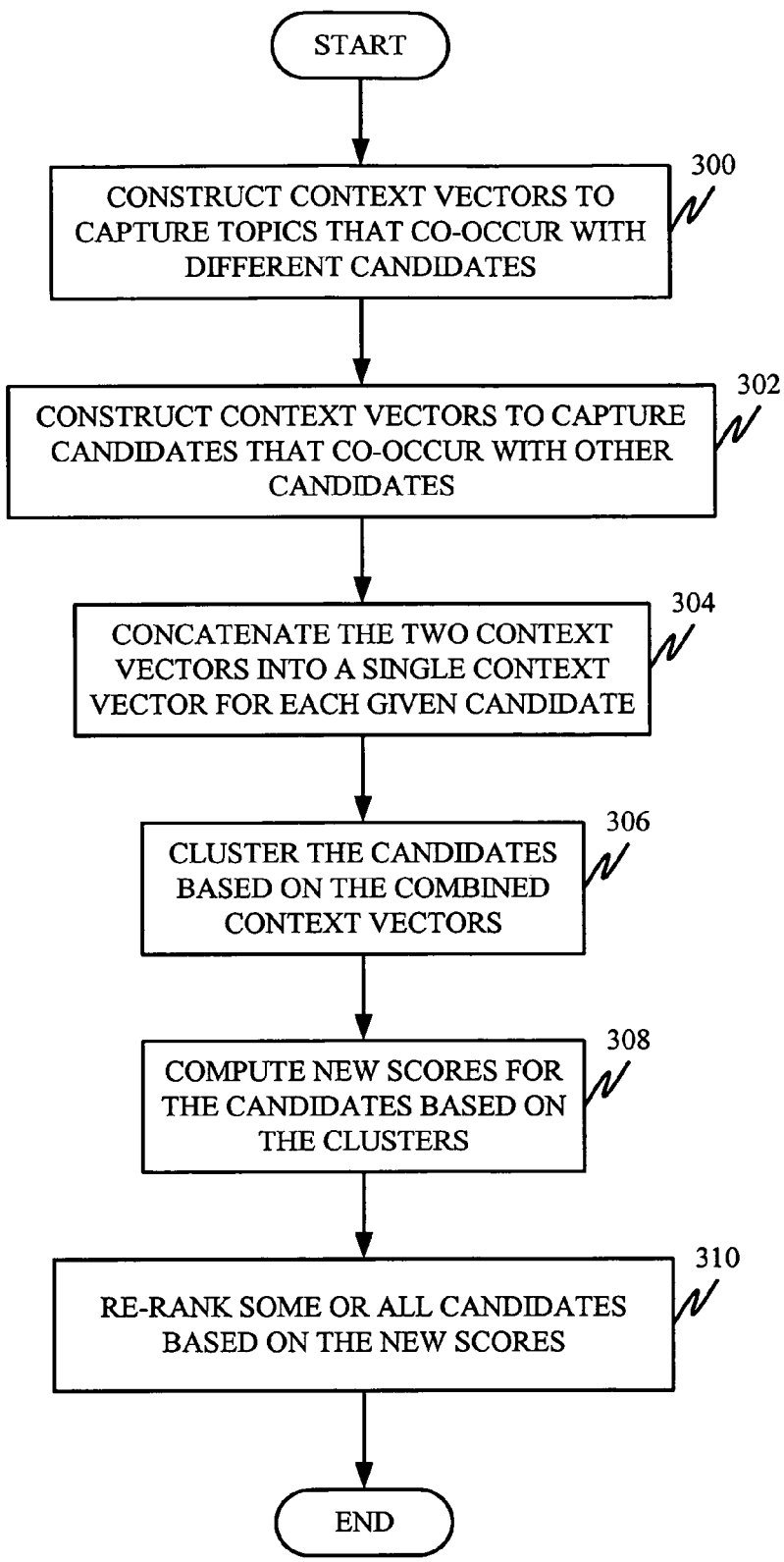
FIG. 6 is a flow diagram illustrating one embodiment of the operation of the cluster based re-ranking component shown in FIG. 2.

FIG. 6 is a flow diagram illustrating the operation of one embodiment of re-ranking component 228 in order to accommodate these two categories. In order to accommodate category 1, a plurality of context vectors are constructed to capture the topics (or subject matter of the query) that co-occur with different candidates in expert list 240. This is indicated by block 300 in FIG. 6.

In order to accommodate the information in category 2, context vectors are also constructed to capture candidates that co-occur with other candidates. This is indicated by block 302 in FIG. 6.

Next, the two context vectors are concatenated into a single context vector for each given candidate. This is indicated by block 304 in FIG. 6. Thus, the combined context vector has both categories of information represented in it.

Next, component 228 clusters the candidates based on the combined context vectors. This is indicated by block 306 in FIG. 6. In one illustrative embodiment, K-Means are used as the mechanism for clustering the candidates. New scores are calculated for re-ranking each of the candidates as follows:

$$p_{new}(e \mid q) = (1-\lambda)p(e \mid q) + \lambda \sum_{e' \in E} p(e' \mid q)/|E| \quad \text{Eq. 5}$$

Where E represents the cluster that the person e' belongs to, and |E| represents the volume of the cluster (the number of people in the cluster). The value of the parameter λ affects the cluster-based re-ranking. The performance of the re-ranking component 228 is relatively insensitive to λ within a relatively wide range, such as 0.05-0.9. In one illustrative embodiment, λ is thus set to 0.5, but other values can be used, as desired.

Using the new scores calculated as described with respect to Eq. 5, the list of experts is re-ranked to provide the re-ranked list of experts 350. In one illustrative embodiment, the top 10 candidates in ranked list 240 are not changed, while the lower ranked candidates are re-ranked. Of course, all candidates could be re-ranked, or fewer or more candidates could be left as originally ranked by component 226, as desired. Computing the new scores for the candidates based on the clusters, and re-ranking some or all candidates based on the new scores is indicated by blocks 308 and 310 in FIG. 6.

It should also be noted that, while re-ranking is shown in FIG. 2 as being performed by component 228, after ranking component 226 provides an initial ranked list of experts 240, the cluster-based scores can be taken into account in co-occurrence model 206. The results of applying component 228 provide an indication as to the relationships among candidate persons, as described above. This can be combined into other submodels in co-occurrence model 206. For example, in submodel 208, given a document 234 relevant to a query 230, if some given candidate person does not occur in the document 234, then for that candidate person, submodel 208 can provide a score that is the average score for all candidate persons that do appear in that document 234 and that are clustered with the given candidate person. In that embodiment, the clustering score is simply taken into account with the scores of the other submodels by ranking component 226. Thus, the ranked list of experts 240 is the final ranked list of experts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A search system, comprising:
 a processing unit;
 a relevance model receiving a query and identifying information comprising a plurality of retrieved documents relevant to the query using the processing unit;
 a co-occurrence model, separate from the relevance model, receiving the identified information and identifying a name of one or more persons, not named in the query, having significant knowledge related to subject matter of the query using the processing unit, based on the query and the identified information, the co-occurrence model comprising:
 a submodel that identifies co-occurrences of the subject matter of the query and a name of a candidate person, not named in the query, in the retrieved documents, and identifies whether the candidate person is related to the subject matter of the query based on the co-occurrences identified, wherein a candidate person who is identified as related to the subject matter of the query is identified as a person having significant knowledge related to the subject matter of the query;

a ranking component configured to rank the identified persons based on results from the co-occurrence model; and a re-ranking component configured to:
compute a score for each of the identified persons having significant knowledge related to the subject matter of the query based on relationships of the identified person with other ones of the identified persons in the retrieved documents, the relationships being identified based on co-occurrence of the identified person and the other ones of the identified persons in similar subject matter contexts in the retrieved documents, and based on the identified person and the other ones of the identified persons co-occurring in some local contexts in the retrieved documents; and re-rank the identified persons based on the re-ranking component scores and output a re-ranked list.

2. The search system of claim 1 wherein the submodel receives metadata associated with the documents and determines co-occurrences of the subject matter of the query and a candidate person based on whether they co-occur in portions of the documents defined by the metadata.

3. The search system of claim 2 wherein the submodel receives anchor text metadata and body metadata, the anchor text metadata being indicative of anchor text in the documents and the body metadata being indicative of a body of the documents.

4. The search system of claim 2 wherein the submodel receives title metadata and body metadata, the title metadata being indicative of titles of the documents and the body metadata being indicative of a body of the documents.

5. The search system of claim 2 wherein the submodel receives title metadata and author metadata, the title metadata being indicative of titles of the documents and the author metadata being indicative of authors of the documents.

6. The search system of claim 2 wherein the submodel receives author metadata and body metadata, the author metadata being indicative of authors of the documents and the body metadata being indicative of a body of the documents.

7. The search system of claim 2 wherein the submodel receives anchor text metadata and author metadata, the anchor text metadata being indicative of anchor text in the documents and the author metadata being indicative of authors of the documents.

8. The search system of claim 2 wherein the submodel receives section metadata indicative of sections of the documents and wherein the submodel identifies co-occurrences of the subject matter of the query and the candidate persons only if they co-occur in a same section of the documents.

9. The search system of claim 2 wherein the submodel receives section tree metadata indicative of a hierarchy of sections, including parent and descendent sections in the documents and wherein the submodel identifies co-occurrences of the subject matter of the query and the candidate persons only if they co-occur within the hierarchy of sections of the documents.

10. The search system of claim 2 wherein the re-ranking component identifies co-occurrence based on clusters of candidate persons, the clusters being computed based on co-occurrences of the candidate persons in a same subject matter context or in context with one another.

11. The search system of claim 1, wherein the re-ranking component is configured to:

construct a plurality of context vectors, comprising at least one context vector capturing the similar subject matter contexts that co-occur with different ones of the identified persons and at least one context vector capturing different ones of the identified persons that co-occur with each other;

combining context vectors for each identified person; and clustering the identified persons based on the combined context vectors.

12. A computer implemented method of identifying persons related to a query, the method comprising:

retrieving a set of documents based on a similarity of the retrieved set of documents to the query;

after retrieving the set of documents, identifying, by name, a set of people having significant knowledge relating to the query, and not specifically identified in the query itself, based on a relationship of the set of people to subject matter of the query, the relationship being determined from the retrieved set of documents, the identification including:
applying a plurality of different co-occurrence submodels to the query and to the retrieved set of documents, each of the plurality of different co-occurrence submodels determining co-occurrence, in one of the documents, of the subject matter of the query and a name of one or more persons from the set of people; and obtaining a score for each of the plurality of different co-occurrence submodels;

applying a weighting factor to each of the plurality of co-occurrence submodel scores using a computer;

combining the weighted submodel scores to obtain an overall weighted score for each person in the set of people;

ranking the set of people identified based on the overall weighted scores; and storing the ranked set of people.

13. The computer implemented method of claim 12 wherein the weighted submodel scores are combined linearly.

14. The computer implemented method of claim 12 wherein the weighting factors vary such that the weighting factor for each of the co-occurrence submodel scores is different from each other.

15. The computer implemented method of claim 14 wherein the weighting factors are set empirically.

16. The computer implemented method of claim 12 wherein one of the plurality of co-occurrence submodels examines contents of both a body and a set of metadata associated with the body, and wherein another one of the plurality of co-occurrence submodels only examines contents of a body and not any associated metadata.

17. The computer implemented method of claim 12 wherein each of the plurality of co-occurrence submodels examines contents of both a body and a set of metadata associated with the body.

18. The computer implemented method of claim 12, wherein each of the plurality of different co-occurrence submodels analyzes a different portion of each document, the different portion comprising at least one of a document body, a document title, a document author, document anchor text, and document metadata.

19. A search system, comprising:
a processing unit;
a relevance model receiving a query and identifying documents relevant to a subject matter of the query using the processing unit, each of the documents having a plurality of parent sections, each of the plurality of parent sections including a plurality of subordinate subsections; and a co-occurrence model, separate from the relevance model, receiving the identified information and identifying names of one or more persons having significant knowledge related to the subject matter of the query, without being named in the query itself, using the processing unit, based on the query and the identified information and wherein the co-occurrence model comprises a submodel that:

receives metadata associated with the documents, including section metadata indicative of the plurality of parent sections and the plurality of subordinate subsections for each of the documents; and identifies co-occurrences of the subject matter of the query and a candidate person, not named in the query, only if:

the subject matter of the query and a name of the candidate person co-occur in a same subordinate subsection, or the subject matter of the query and a name of the candidate person co-occur in different subordinate subsections that have a common parent section.

20. The search system of claim 19, wherein the co-occurrence model comprises a plurality of different co-occurrence submodels, each of the plurality of different co-occurrence submodels analyzes a different portion of each document, the different portion comprising at least one of a document body, a document title, a document author, document anchor text, and document metadata.

* * * * *